United States Patent

[11] 3,616,290

[72] Inventors Emil Toledo
Natick;
Peter Semienko, Roslindale, both of Mass.
[21] Appl. No. 828,723
[22] Filed May 28, 1969
[45] Patented Oct. 26, 1971
[73] Assignee Honeywell Inc.
Minneapolis, Minn.
Continuation-in-part of application Ser. No. 606,555, Jan. 3, 1967, now abandoned.

[54] METHOD OF MAKING PLATED MEMORY FILM

7 Claims, No Drawings

[52] U.S. Cl. 204/27, 204/43
[51] Int. Cl. C23b 5/32
[50] Field of Search 204/43, 27, 112, 123; 106/1; 117/130 E; 340/174 TF

[56] References Cited

FOREIGN PATENTS 1,396,114 3/1965 France 204/43

OTHER REFERENCES

F. C. Mathers et al., " Trans. Am. Electrochemical Soc.," Vol. 29, pp. 383- 394, (1916).

B. F. Bartelson et al., " IBM Tech. Disclosure Bulletin," Vol. 3, No. 2, p. 63, July 1960.

*Primary Examiner*—G. L. Kaplan
*Attorneys*—Charles J. Ungemach, Ronald T. Reiling and James A. Phillips

ABSTRACT: Thin magnetic nickel-iron alloy memory films electroplated from an aqueous electrolyte including chloride, sulfate and ammonium sulfate as nickel source ion materials. Such an electrolyte is found to improve bath stability and reliability in continuous plating and also improve magnetic memory properties while alleviating such prior art electroplating difficulties as bath instability, decomposition, residue, difficulty of analysis, source material impurity and unreliability, source ion depletion and control over magnetic properties. The resultant plate has improved microstructure, with reduced stress and finer (controlled) grain structure and also has superior magnetic flux density and dispersion characteristics.

METHOD OF MAKING PLATED MEMORY FILM

This application is a continuation in part of application Ser. No. 606,555 for "Plated Memory Film and Associated Method" filed Jan. 3, 1967, now abandoned.

BACKGROUND PROBLEMS, INVENTION FEATURES

Thin magnetic films of nickelous alloys are commonly electroplated, such as upon a small wire substrate, especially for memory applications, such as "DRO" wire memory planes in data processing apparatus. The magnetic properties of such films are difficult enough to control in batch plating, especially for films having a very precisely defined magnetostriction characteristic, since the magnetic properties and associated metallographic-plated structure are uncommonly sensitive to virtually the slightest change in the type or quantity of electrolyte constituents and plating conditions. Workers in this art thus recognize that such a plated wire memory, for instance, is practically impossible to plate to today's memory specifications, even under the more controllable batch conditions. Thus, it becomes several orders of magnitude more difficult to plate such films continuously, especially with any kind of yield (according to the number of dropouts, plating imperfections, etc. in a length of plated wire). The present invention has approached this imposing problem and filled this need by providing an electrolyte having a novel advantageous combination nickel source ion materials and, most surprisingly, plating continuously to satisfy these rigorous specifications where known electrolytes (e.g., having such materials singly and not in combination) fail.

The prior art has taught various methods of electroplating such nickel-rich magnetic thin film alloys, such as for plating Permalloy (nickel-iron) onto a wire substrate. One such method involves using sulfate materials as the nickel (and iron) source material, alone or in combination with other source materials. However, such a "sulfate" bath has been found unable to plate memory films satisfying the foregoing objectives, for instance sine the resultant plate exhibits too much stress and too coarse a grain structure. Another such prior art electrolyte employs nickel chloride source ion materials (alone or in combination, e.g. with ferrous chloride). However, this "chloride" bath has virtually the same problems as the aforementioned "sulfate" bath, plus the additional problem of creating a very "dirty" bath; that is, leaving considerable residue, such as the familiar "red anode" residue, which, as is well known, can soon degrade magnetic characteristics drastically by preventing the constant plating of (80.5 $N_i$/19.5 Fe) Permalloy and by introducing dropouts.

Another such prior art electrolyte uses nickel sulfamate source ion materials, alone or n combination with other such materials. While such "sulfamate" baths are advantageous for some applications similar to the present case, they can present some very unpleasant problems in preparing an electrolyte to give reproducible reliable plating characteristics. For instance, nickel sulfamate cannot be procured in "AR grades" and thus can vary widely in purity; for instance, including metals in concentrations that are not compatible with the plating specifications. Such impurities are the ferric ion which has been found present in quantities which disastrously interfere with even the crudest type plating (e.g. of noncritical nonmagnetic nickel), obviously being completely unacceptable for the critical memory purposes described. Such sulfamates are extremely difficult to analyze in a bath (such as with a continuous plating operation); moreover, they tend to decompose so that the electrolyte soon becomes unstable—something quite undesirable in continuous platings. Also they must typically be replaced bi-weekly instead of monthly and can produce dirt decomposition products that often interfere with plating, such as by plugging cells.

The present invention avoids the aforementioned fabrication difficulties and plates to the aforementioned rigorous magnetic memory specifications. More particularly, the invention teaches an electrolyte which has none of the aforementioned fabrication problems such as decomposition, instability, short life, bath residue, etc., and plates structures without the aforedescribed defects of stress, too coarse a grain structure, or the like. More particularly, the invention prescribes a trinickel electrolyte including chloride, sulfate and ammonium sulfate nickel source ion materials providing these advantages. Such an electrolyte also gives improved control over magnetic properties, allowing a great increase in nickel (and other) source ion concentration, thus increasing efficiency and avoiding bath depletion. This electrolyte also greatly alleviates the aforementioned "red anode residue" problem, reducing such residues by about 75 percent. The electrolyte also provides greatly increased solubility in turn permitting much higher nickel concentrations (and, consequently, iron concentration) thereby enabling long periods of continuous plating without replenishment of nickel or iron.

It is therefore an object of the present invention to provide the aforementioned features and advantages and avoid the aforementioned problems and drawbacks of prior art plated films and processes for producing them. More particularly, it is an object of the invention to electroplate a thin magnetic nickel-rich film. Another object is to plate such a film having improved magnetic memory characteristics such as reduced stress and improved metallographic structure, such as finer grain structure. Another related object is to continuously electroplate such films from electrolytes having satisfactory characteristics relative to stability, decomposition, residue, life, depletion, source ion analysis and the like. A related object is to provide such an electrolyte with better control over magnetic properties of the plate, especially for zero magnetostrictive Permalloy memory films.

Thus, according to a preferred embodiment of the invention, an aqueous electrolyte is provided for continuously electroplating thin magnetic memory Permalloy films onto a wire substrate, the electrolyte being prepared from chloride, sulfate and ammonium sulfate nickel source ion materials. In its preferred from this source ion material is added so that maximum amounts of nickel ammonium sulfate is included, in the range of saturation concentration, and then sufficient nickel chloride and nickel sulfate are added to, together, provide maximum nickel ion concentration, these latter being preferably added in the range of relative proportions of from about2:1 to about 1:2.

ELECTROPLATING METHOD

By way of example, the invention in light of the following examples of specific exemplary electrolytes and associated methods for electroplating the aforementioned thin magnetic Permalloy (or related nickel alloy) films will now be discussed. However, it will be understood that these examples do not, in themselves, limit the invention to the precise conditions, ingredients, applications, etc. mentioned, but rather indicate propaedeutic embodiments enabling those skilled in the art to practice the best mode of the invention as defined within the scope of the appended claims, as well as suggesting suitable equivalents therefor. As instructive initial illustrative examples of the invention, first to be discussed are the following electrolytes comprising baths A and A1 through A5, found advantageous for batch electroplating of thin Permalloy magnetic films upon a wire substrate prepared in a prescribed, carefully controlled manner.

One such wire substrate and satisfactory wire preparation technique is described in copending, commonly assigned U.S. Pat. Application Ser. No. 518,013 of P. Semienko and E. Toledo entitled "Metal Treatment," now U.S. Pat. No. 3,556,957, issued Jan. 19, 1971 incorporated by reference herein. It is also preferred that this wire be provided with a copper coating according to a process described in copending commonly assigned U.S. Pat. Application Ser. No. 518,184 entitled "Improved Copper Coating" of Semienko et al. now U.S. Pat. No. 3,506,546, issued Apr. 14, 1970, the details of which are incorporated herein. Reference may also be had to a third copending, commonly assigned U.S. Pat application Ser. No. 517,944 of E. Toledo and P. Semienko, entitled "Electroplating Bath and Method," now U.S. Pat. No. 3,489,660, issued Jan. 13, 1970, the details of which are incorporated by reference herein. Thus, according to the above, it is preferred to use a wire substrate prepared to exhibit prescribed dimensional, metallurgical, and surface characteristics, such as having a coating of at least ½ mil. copper, polished to a prescribed smoothness of about No.12 (±2—STM rating). A 5 mil. (diameter) wire having a beryllium-copper core has been found satisfactory for this, being introduced at the beginning of the magnetic plating electrolyte by unwinding from a spool, each portion being immersed in the plating electrolyte for about 1—2 minutes to plate a thin magnetic Permalloy coating about 0.75–1.5 microns thick. The Permalloy will exhibit the proper magnetic memory characteristics and also, preferably, will have zero magnetostriction. Such a plating may be batch-produced with the following typical aqueous electrolyte of bath A and associated plating conditions.

BATH A (Batch Plating)

| | Typical (gm./L.) | Representative range (gm./L.) |
|---|---|---|
| Nickel ammonium sulfate $Ni(NH_4)_2(SO_4)_2 \cdot 6H_2O$ | 100 | 90–100. |
| Nickel chloride, $NiCl_2 \cdot 6H_2O$ | 100 | 50–170. |
| Nickel sulfate, $NiSO_4 \cdot 6H_2O$ | 100 | 0–120. |
| Boric acid | 45 | 30–60. |
| Saccharin | 3.3 | 1–4. |
| Sodium lauryl sulfate | 0.004 | 0.004 mon. |
| Ferrous ammonium sulfate $Fe(NH_4)_2(SO_4)_2 \cdot 6H_2O$. | as required for desired magnetic and magnetostriction properties | |
| Water (distilled) | to provide calculated total volume | |
| Temperature (°C.) | 69–71 | 65–75. |
| pH | 2.6–2.8 | 2.1–2.8. |
| Plating time | 1–2 min. for 1–1.5 microns plate. | |

The electroplated film will be formed, as understood in the art, to have magnetic properties conventionally determined by alloy composition, film thickness, and other known parameters. Modifications of Bath A, namely Baths A1 through A5, are indicated in table I below, wherein the concentrations as measured in grams per liter of nickel source ion materials were varied somewhat (within the indicated range in Bath A), as follows:

TABLE I

| Baths | A-1 | A-2 | A-3 | A-4 | A-5 | A-6 |
|---|---|---|---|---|---|---|
| Nickel chloride (gm./l) | 100 | 50 | 60 | 60 | 70 | 170 |
| Nickel sulfate (gm./L) | 100 | 120 | 120 | 75 | 100 | 0 |
| Nickel ammonium sulfate (gm./L) | 100 | 100 | 100 | 90 | 100 | 100 |

Effort was directed toward adapting the aforementioned plating methods for continuous plating. For this purpose, a Bath B is prescribe using the wire substrate of the type aforedescribed and so prepared, unspooled to be continually advanced through a magnetic plating station including the electrolyte and conditions enumerated below. Bath B is a modification of Baths A above, and is here adapted to similarly plate a thin magnetic Permalloy film 1–1.5 micron thick. This magnetic plating station can be placed in line downstream of the wire preparing stations (such as the electropolishing station, etc., the copper-surfaced wire, as treated, will be presumed to have a 5 mil(±0.5) diameter and to be advanced continuously at about 4 inches/minute. It will be presumed that besides the plating constraints described below, the electroplating will be otherwise conducted as known by those skilled in the art. It is preferred to use a soluble, pure nickel anode as well as, preferably, nonmetallic fluid distributing means to distribute the electrolyte homogeneously about the wire substrate during plating. A preferred form of such a distributing means accommodates high agitation, low turbulence, high current density conditions. Thus, the indicated magnetic film is plated from the aqueous electrolyte described in Bath B, below and under the indicated associated plating conditions.

BATH B (Continuous Plating)

| | Representative (gm./L.) | Optimum range (gm./L.) |
|---|---|---|
| Nickel chloride | 75 | 50–120 |
| Nickel sulfate | 100 | 50–120 |
| Nickel ammonium sulfate | 100 | 90–110 |
| Boric acid | 45 | 30–60 |
| Saccharin | 3.3 | 1–4 |
| Sodium lauryl sulfate | 0.025 | 0.004 min. |
| Water (distilled) | to provide calculated total volume | |
| Ferrous ammonium sulfate | e.g. 70–90 (for zero magnetostriction at this T° etc.) | |
| Temperature (°C) | 69–71° | 65°–75° |
| pH | 2.6–2.8 | 2.1–2.8 |
| Plating time = | 4.3"/min. speed per 1¼ microns plating in a cell 1 inch long | |
| Specific gravity | 1.195 | |
| Typical Ion Concentration: | | |
| Ni | 78 g/L. | |
| Fe | 1.6 g/L. | |
| Using Nickel Anode (300–400 ASF. – 5 mil × 1 in. Anode at 35–42 ma.) | | |

The magnetic plating solution of Bath B is prepared in a 10 liter volume by adding 500 grams of $Ni(NH_4)_2SO_4 \cdot 6_20$ to 225 grams of Boric Acid in 1,500 ml. of water at 70° C. Two such portions are required per solution. Next, 1,000 grams of Nickel Sulfate, 750 grams of Nickel Chloride and 23 grams of Saccharin are added to two liters of water at 70° to 80° C. When these three portions are completely dissolved, they are mixed in a 5 gallon polyethylene container. The required iron portion is then dissolved rapidly in about 1,400 ml. of cold (20° C max.) water and poured into the remainder of the solution. Unless the ferrous iron is added in just this manner, and rather quickly, there is danger of poisoning the solution (by oxidation to ferric iron). Sodium Lauryl Sulfate is added when the solution is utilized for plating Permalloy.

TABLE II

| Baths | B-1 | B-2 | B-3 | B-4 | B-5 | B-6 |
|---|---|---|---|---|---|---|
| Nickel Chloride (gm./L.) | 100 | 50 | 60 | 60 | 70 | 140 |
| Nickel Sulfate (gm./L.) | 100 | 120 | 120 | 75 | 100 | 0 |
| Nickel Ammonium Sulfate (gm./L.) | 100 | 100 | 100 | 90 | 100 | 100 |

Baths B-2 and B-6 were observed to have inferior magnetic properties (e.g. dispersion and magnetic output) for DRO wire applications and a some what lower plating yield (about one-half).

In accordance with the aforementioned objectives, it was found that the foregoing continuous plating processes with Baths, B, B-1, etc.; yielded a magnetic plated film in accordance with the described desirable characteristics. That is, these "trinickel" electrolytes, being very conveniently prepared with "reagent grade" nickel sulfate and nickel chloride, gave completely reproducible characteristics if mixed, as indicated. More especially, they gave a more stable alloy plating, had a higher metal ion concentration, and gave a more stable alloy plating, had a higher metal ion concentration, and produced superior quality wire on the substrate, as well as giving good yields. It will be remembered that these two materials can be procured in "AR Grade" qualities whereas some such prior art materials cannot, allowing one to, with these, better guarantee the reproducibility and reliability of plating. These two additives, in conjunction with the ammonium sulfate, also produce a more stable, longer-lived and nonprecipitating electrolyte especially advantageous for continuous plating. For example, because they allow a much higher source ion (nickel) concentration (and, thus, a higher Fe concentration also when plating a particular alloy), they greatly improve stability without bath depletion. For instance, these materials have been observed to continuously plate up to 10 hours where an analogous prior art sulfamate-type bath is stable for only about 1 and ½ hours maximum under the same conditions.

It has been found that a convenient formula for adding the aforementioned "trinickel" ion materials to the electrolyte is the following:

First: dissolve a maximum concentration of nickel ammonium sulfate in the aqueous electrolyte; that is, up to saturation concentration consistent with stability; and Second: and then add sufficient of both nickel chloride and nickel sulfate to, together, derive a prescribed maximum nickel ion concentration consistent with bath stability, these together being present in relative proportions in the range of about 2:1 through 1:2. While in some instances the nickel sulfate might be eliminated, plating quality will suffer, for instance, leading to a lower recorded bit output and a poor dispersion characteristic.

In practice, this procedure results in the nickel ammonium sulfate being present in an amount at least as great as the amount of either the nickel sulfate or of the nickel chloride.

As a further example of such a "trinickel" electrolyte a second set of continuous electroplating conditions, similar to those described for Bath B, are described for preferred Bath C and associated Baths C-1 through C-3, involving relatively the same electrolyte and plating conditions, the proportions of sulfate and chloride nickel source ion materials being modified, for instance:

TABLE III (gm/L)

| Baths: | C-1 | C-2 | C-3 |
|---|---|---|---|
| $NiSO_4 \cdot H_2O$: | 80 | 110 | 80 |
| $NiCl_2 \cdot 6H_2O$: | 80 | 60 | 60 |
| Ferrous Ammonium Sulfate: | Adjust to normalize Magetosriction | | |

| BATH C (Continuous Plating) | | Amount g./l. |
|---|---|---|
| Nickel Chloride $NiCl_2 \cdot 6H_20$ | | 95 |
| Nickel Sulfate $NiSO_4 \cdot 6H_20$ | | 110 |
| Nickel Ammonium Sulfate $Ni(NH_4)_2(SO_4)_2 \cdot 6H_20$ | | 100 |
| Boric Acid | | 45 |
| Saccharin | | 2.3 |
| Sodium Lauryl Sulfate | | 0.1 |
| Water (distilled) | | to provide calculated total volume, approximately 0.8 liter per liter total volume |
| Ferrous Ammonium Sulfate $Fe(NH_4)_2(SO_4)_2 \cdot 6H_20$ | | 8–10 (Adjusted for zero magnetostriction |
| Temperature | | 69–71° C. |
| pH | | 2.6–2.9 |
| Specific Gravity | | 1.165 |
| Ion concentration | Ni | 68 gm./L |
| | Fe | 1.4 gm./L |

The foregoing continuous plating process associated with Baths C yielded plated wire of acceptable magnetic characteristics, comparable with Baths B (in the case of preferred Bath C especially) and derived similar advantages, such as the same metal ion concentration and good plating structure. As before, this was achieved using convenient reliable "AR grade" chemicals, giving good yield, a stable electrolyte, etc. It was further found possible to control DRO magnetic properties simply by varying the ratio of nickel sulfate to nickel chloride, within the aforementioned 2:1–1:2 range of relative proportions. These results and those with Baths B verify the indicated superiority of the "trinickel" electrolyte of the invention, especially when used at the highest source ion concentrations (e.g. like Baths C and B).

In both of the above electroplating methods, namely those associated with Baths B and Baths C, several general characteristics may be observed. With a prescribed bath temperature, a prescribed amount of nickel ion source material will be soluble up to saturation, of course, and this in turn will dictate the proportionate amount of ferrous ion material necessary to give the prescribed magnetic properties (e.g. 80Ni/20 Fe fine-adjusted for zero magnetostriction). While other source ion ingredients may be used, it is preferred to use ferrous ammonium sulfate because it is conveniently available in high grade, inexpensive forms, is more stable than certain other ingredients, for instance, than ferrous sulfamate, not being subject to oxidation below pH 3.0.

While the above-described "trinickel" electrolyte is generally superior to any known analogous electrolyte, it has been found that it has certain special advantages over those using nickel sulfamate as a source ion material such as described in the referenced copending applications. For instance, when preparing 10 liters of the aforementioned Bath B-1, the replacing of about 500 grams nickel chloride with about 500 ml. nickel sulfamate results in a plating having lower recorded bit output and only fair dispersion. A similar result occurs when the same amount of nickel sulfamate replaces only 250 grams nickel chloride. Moreover, when the 1,000 grams nickel sulfate in Bath B-5 is replaced with 700 ml. nickel sulfamate, the results are similarly unsatisfactory.

In summary, it will be understood by those skilled in the art that the foregoing relates to a thin magnetic nickelous plated film useful as "DRO" Permalloy wire memory or the like For instance, as aforedescribed, such an electroplated Permalloy film on a wire exhibits unique magnetic properties, such as uniquely high magnetic readout strength, uniquely low (adjacent-bit) disturb sensitivity and a uniquely fine plated grain structure, the latter being especially unusual for a "noncomplex ion" type electrolyte (like sulfamate type).

Further, the foregoing teaches a uniquely advantageous electroplating technique whereby one can plate significant quantities of "memory wire" having these magnetic characteristics (e.g. in effective lengths of 6-8 inches or more) and do so with no significant "dropouts" (magnetic test output too low) caused by the plating per se (as opposed to those caused otherwise, e.g. by substrate condition etc.). More particularly, a "trinickel"-type electrolyte is taught which, for such continuous plating, is unusually clean, is uniquely long-lived and is uniquely stable, i.e. allows continuous plating of 80-20 Permalloy for very long periods (e.g. 9 hours) without replenishing the source ion material, yet without bath depletion or decomposition problems.

The aforementioned nickel source ion materials of the "-trinickel" electrolyte have also been found useful for electroplating other nickelous films including nonmagnetic films, although, of course, many of the aforementioned characteristics and advantages are not kept (e.g. the 2:1–1:2 range of sulfate to chloride materials). For instance, all three nickel source materials were used, alone and with other nickel source materials, to plate magnetic nickel-cobalt and nickel-cobalt-iron films, the resultant plate keeping some of the advantageous features found in the aforedescribed Permalloy plate. Moreover, a simple nickel film was electroplated from these 3 nickel source materials, and again, some advantageous features were retained.

It will be apparent to those skilled in the art that the principles of the present invention may be applied to different embodiments from that shown; for instance, to other types of substrates for improving the magnetic properties of films plated thereon. While in accordance with the provisions of the patent statutes, there have been illustrated and described the best forms of the invention known, it will be apparent to those skilled in the art that changes may be made in the elements prescribed, the conditions described or the processes disclosed, etc., without departing from the spirit of the invention as set forth in the appended claims; and that, in some cases, certain features of the invention may be used to advantage without a corresponding use of other features.

I claim:

1. An aqueous acidic electrolyte for plating a magnetic information-storing nickel-iron alloy film, with a nickel-iron ratio of about 80/20, on a nonmagnetic conductive substrate for providing a plated wire memory element, said electrolyte consisting essentially of A. nickel ammonium sulfate in a concentration of between 90 and 100 grams per liter, B. nickel chloride in a concentration of between 50 and 120 grams per liter, C. Nickel sulfate in a concentration of between 50 and 120 grams per liter, D. boric acid in a concentration of between 30 and 60 grams per liter, E. saccharin in a concentration of between 1 and 4 grams per liter, F. sodium lauryl sulfate in a minimum concentration of about 4 milligrams per liter, and G. ferrous ammonium sulfate in a concentration of about 70–90 grams per liter to provide the ratio of iron to nickel desired in said alloy.

2. An aqueous electrolyte as defined in claim 1 having a pH between 2.1 and 2.8.

3. A method of preparing a magnetic memory element having a magnetic nickel-iron information-storing layer, with a nickel-iron ratio of about 80/20, on a nonmagnetic, electrically conductive substrate, said method including plating said substrate with said information-storing layer by means of the steps of A. preparing an aqueous acidic electrolyte 1 having iron source material, and 2 having nickel source material in an amount relative to the amount of said iron source material to deposit said alloy layer, and consisting essentially of nickel ammonium sulfate, nickel sulfate and nickel chloride, with the weight ratio of the amount of nickel sulfate to nickel chloride being between one to two and two to one, and with the amount of nickel ammonium sulfate being at least as great as the amount of each of said nickel sulfate and said nickel chloride, and B. electroplating said layer onto said substrate from said electrolyte with said substrate being connected as the cathode.

4. A method as defined in claim 3 comprising the further step of providing said aqueous electrolyte with a pH substantially between 2.1 and 2.8.

5. A method as defined in claim 3 in which said aqueous electrolyte-preparing step is further characterized by providing said nickel ammonium sulfate in a concentration of between 90 and 100 grams per liter, providing said nickel sulfate in a concentration of between 50 and 120 grams per liter, and providing said nickel chloride in a concentration of between 50 and 120 grams per liter.

6. A method as defined in claim 3 in which said electroplating step includes maintaining said aqueous electrolyte at a temperature of about 65° to 75° C. during said electroplating.

7. In the manufacture of plated wire memory element having a magnetic information-storing nickel-iron alloy film, with a nickel-iron ratio of about 80/20, on a nonmagnetic electrically conductive substrate, the method of providing said alloy film comprising the steps of A. preparing an aqueous electrolyte for depositing said film and consisting essentially of water and 1 nickel chloride in concentration of about 50 to 120 grams per liter, 2 nickel sulfate in a concentration of about 50 to 120 per liter, 3 nickel ammonium sulfate in a concentration of about 90 to 100 grams per liter, 4 boric acid in a concentration of about 30 to 60 grams per liter, 5 saccharin in a concentration of about 1 to 4 grams per liter, 6 sodium lauryl sulfate in a minimum concentration of about 4 milligrams per liter, 7 ferrous ammonium sulfate in a concentration to provide the nickel-iron ratio desired in said film, B. providing said electrolyte with a pH between 2.1 and 2.8, C. maintaining said electrolyte at a temperature of about 69° to 71° C., and D. electroplating said alloy film onto said substrate from said electrolyte with said substrate connected as the cathode.

* * * * *